United States Patent
Kertesz

(10) Patent No.: US 6,905,147 B2
(45) Date of Patent: Jun. 14, 2005

(54) COUPLING MEMBER FOR CONNECTING A FUEL RECEIVING OR FUEL DISPENSING PART TO A FLUID LINE AND METHOD FOR ITS MANUFACTURE

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/651,816

(22) Filed: Aug. 28, 2003

(65) Prior Publication Data
US 2004/0051304 A1 Mar. 18, 2004

(30) Foreign Application Priority Data
Sep. 3, 2002 (DE) .......................... 102 40 521

(51) Int. Cl.⁷ .............................................. F16L 13/00
(52) U.S. Cl. .................. 285/285.1; 285/21.1; 285/189; 285/288.1
(58) Field of Search .................. 285/288.1, 21.1, 285/141.1, 285.1, 293.1, 22, 189; 137/202, 587; 277/606, 608, 645

(56) References Cited

U.S. PATENT DOCUMENTS

| | | | |
|---|---|---|---|
| 6,289,915 B1 | | 9/2001 | Nulman et al. |
| 6,422,261 B1 | * | 7/2002 | DeCapua et al. ........... 137/202 |
| 6,679,282 B2 | * | 1/2004 | Aoki et al. .................... 137/43 |
| 2001/0050478 A1 | | 12/2001 | Schmitz |
| 2002/0117206 A1 | | 8/2002 | Benjey et al. |
| 2003/0173776 A1 | * | 9/2003 | Morohoshi et al. ......... 285/189 |
| 2004/0051305 A1 | * | 3/2004 | Kertesz ....................... 285/189 |

FOREIGN PATENT DOCUMENTS

| | | |
|---|---|---|
| DE | 195 35 413 C1 | 10/1996 |
| EP | 1063078 | 12/2000 |
| EP | 1241039 | 9/2002 |
| WO | 0073039 | 12/2000 |
| WO | 0161233 | 8/2001 |
| WO | 0162535 | 8/2001 |
| WO | 0190609 | 11/2001 |

OTHER PUBLICATIONS

Eigl F A et al: "Mehr Verstaendnis Fuer Den Kern" Kunststoffe, Carl Hanser Verlag, Munchen, DE, vol. 88, No. 1, pp. 46–48, 50, 1998.

Jaroschek C: "Appetit Auf Sandwich?", Kunststoffe, Carl Hanser Verlag, Munchen, DE, vol. 87, No. 1, pp. 33–35, 1997.

* cited by examiner

Primary Examiner—Aaron Dunwoody
(74) Attorney, Agent, or Firm—Friedrich Kueffner

(57) ABSTRACT

A coupling member for connecting a part, provided for receiving or dispensing fuel and made primarily of HDPE (high-density polyethylene), to a fluid line has first, second, and third components made of meltable material. The third component forms a heat fusion joint with the part for receiving or dispensing fuel and has an undesirably high permeability and swelling capacity relative to fuel. The third component is connected to the first component by material bonding and positive-locking action. The second component has greater fuel blocking capacity and higher strength than the third component. The second component is embedded in the third component. A volume ratio of second and third components is selected such that combined properties of the second and third components concerning permeability, strength, and volume changes by swelling are approximated to these same properties of the second component. The first and third components are heat-fusible to one another.

11 Claims, 1 Drawing Sheet

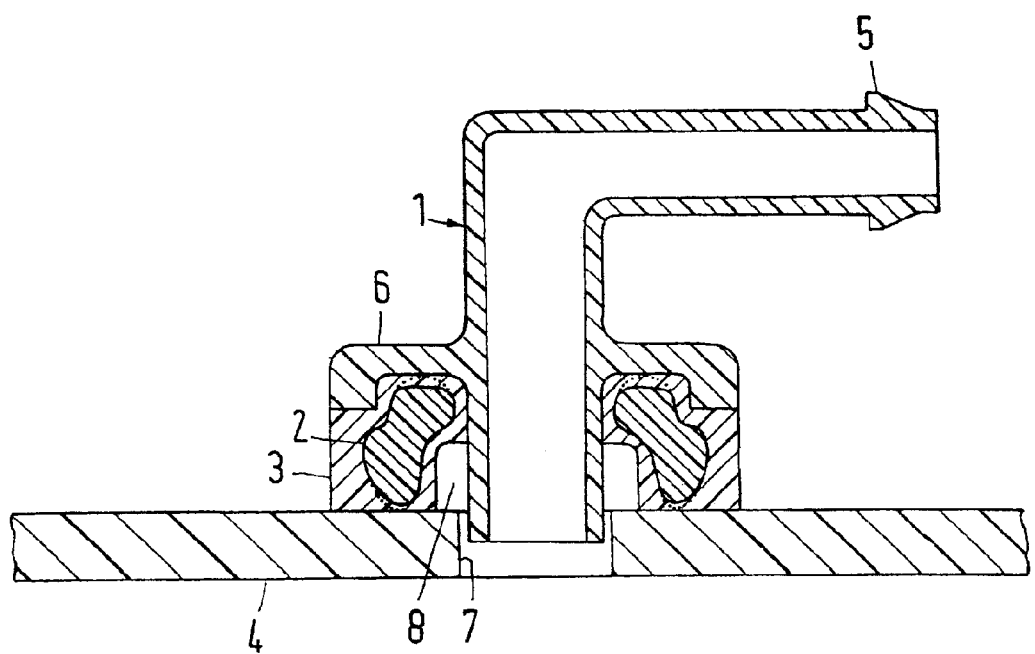

COUPLING MEMBER FOR CONNECTING A FUEL RECEIVING OR FUEL DISPENSING PART TO A FLUID LINE AND METHOD FOR ITS MANUFACTURE

BACKGROUND OF THE INVENTION

1. Field of the Invention

The invention relates to a coupling member, in particular, a pipe-shaped socket, for connecting a part, provided for receiving or dispensing fuel and made primarily of HDPE (high-density polyethylene), to a fluid line, wherein the coupling member has first, second, and third component of primarily meltable material, in particular, thermoplastic material, of which the third component forms a heat fusion joint with the fuel-carrying part and has an undesirably high permeability and swelling capacity relative to fuel and is connected to the first component in a material-bonding and/or positive-locking way, while the second component has a greater blocking capacity relative to fuel and a higher strength than the third component. The invention is also directed to a method for manufacturing the coupling member.

2. Description of the Related Art

In a known coupling member (DE 195 35 413 C1) of this kind the first and second components have a high impermeability with regard to diffusion of fuel, such as gasoline or diesel fuel, but not the third component which is welded or fused to the fuel-carrying part, i.e., the fuel tank. The material of the third component must always be selected such that it can form a heat fusion joint or connection with the fuel tank that is generally primarily made of—at least its outer layer—HDPE (high-density polyethylene); HDPE is not sufficiently impermeable with respect to diffusion of fuel. The amount of fuel which diffuses per time unit through the third component is minimal but can not be neglected over an extended period of time. Moreover, the material of the third component has an undesirably high swelling capacity relative to fuel and minimal tearing strength. When the material swells, the coupling member can tear off the tank.

SUMMARY OF THE INVENTION

It is an object of the present invention to improve a coupling member of the aforementioned kind such that less fuel per time unit diffuses through it and a reduced swelling capacity but higher strength is provided than before.

In accordance with the present invention, this is achieved in that the material of the second component is completely or primarily embedded in the material of the third component and the ratio of the volumes of the second and third components is selected such that the combined properties of the second and third components with respect to their fuel permeability, strength, and volume changes caused by swelling are approximated to that of the second component and that the materials of the first and third components can be connected by heat fusion.

According to this solution, the second component prevents substantially a diffusion of fuel through the third component and its swelling caused by taking up fuel. The reduced swelling increases the strength of the connection between the third component and the part serving for receiving and dispensing fuel. The degree of swelling is also reduced in that the proportion of the volume of the third component relative to the total volume of the second and third components is reduced. Accordingly, the total strength of the combination of the second and third components is also greater than that of the third component alone.

While the material of the first component may contain at least one of the materials PA, POM, PBT, PEN, PET, PBN, PPS, PPA, PP, aliphatic polyketone, LCP, and fluoro-thermoplastic material, the second component may contain at least one of the materials EVOH, PBT, PEN, PET, PBN, POM, PA, PPS, PPA, LCP, aliphatic polyketone and fluoro-thermoplastic material or at least one metal or glass, and the third component a polyolefin, in particular, functionalized polyethylene, which can be connected by heat fusion to the material of the fuel-carrying part.

The material of the second component can be modified such that the materials of the second and third components can be heat-fused with one another and with the fuel-carrying part. When the fuel-carrying component contains HDPE, the second or third component or both components can be connected to the HDPE of the fuel-carrying component by friction welding or by heat reflector welding.

Moreover, the shape of the second component within the third component can be selected such that 10 to 100% of the cross-section of the third component, which cross-section is permeable for the fuel, can be covered by the second component.

In particular, the second and third components can be annular. The coupling member is then suitable in particular for being connected to the opening of the container, in particular, a tank.

In this connection, the first component can be tubular and surrounded by the third component. In this connection, the tubular component can be at the same time shaped for providing a connection to the fluid line, for example, can be provided with one or several securing ribs onto which a fluid line in the form of a hose can be clamped.

Moreover, the first component can have a flange which engages across the third component. In connection with the fact that the first component is tubular and surrounded by the third component, this provides in a simple way a positive-locking and material-bonding connection of the first and third components.

The coupling member, depending on the application, can have different shapes. For example, it can be at the same time a connecting socket, a housing of a valve, a filling socket, or a fasting flange for a fuel pump.

Moreover, it is an object of the invention to provide a simple method for manufacturing the coupling member according to the invention.

In accordance with the present invention, this is solved in that the material of the second component is injected into the still formable (ductile) core of the third component and the third component is partially embedded by injection molding in the material of the first component when the first component is shaped. According to this solution, shaping of the third component and injection of the plastic material of the second component into the still formable core of the third components can be realized by means of the same shaping tool. Since during injection of the material of the second component into the still formable core of the third component, waves or swirls occur on the boundary surfaces of the materials of both components, the injection not only provides a material-bonding connection by heat fusion of the two materials but also a positive-locking connection between the second and third components. Moreover, embedding by injection molding of the third component by the material of the first component provides in a simple way a material-bonding and positive-locking connection between the first and third components.

In order to prevent that the material of the third component during injection of the materials of the second component is decomposed as a result of too high a temperature of the material of the second component, the processing temperature of the material of the second component is selected to be smaller than the decomposition temperature of the material of the third component.

BRIEF DESCRIPTION OF THE DRAWING

In the drawing:

FIG. 1 shows a cross-section of one embodiment of the coupling member according to the invention which is connected to the opening rim of a partially illustrated fuel-carrying part in the form of a fuel container.

DESCRIPTION OF THE PREFERRED EMBODIMENTS

The coupling member, in detail, is comprised of a first component 1, a second component 2, and a third component 3 which are comprised primarily of a meltable material, in the illustrated example, primarily of thermoplastic material, and which are connected to one another in a material-bonding and positive-locking way. As an alternative, they could be connected either by material bonding or by a positive-locking connection.

The component 3 and the fuel-carrying part 4 are also connected by material bonding by means of friction welding or heat reflector welding wherein this type of welding or fusing results in a heat fusion joint or connection between the component 3 and the part 4.

The component 1 is a substantially tubular socket which is angled at 90E and provided with a securing rib 5 in the vicinity of its end across which a hose is pushed and secured on the pipe socket by means of a hose clamp. Instead of only a single securing rib 5, it is also possible to provide several such securing ribs in sequence. Moreover, the component 1 has a flange 6 which engages across the component 3 and has a section which penetrates through the component 3 into an opening 7 of the part 4 in order to center the coupling member relative to the opening 7 when welding the coupling member to the part 4.

The component 2, like the component 3, is annular and has been injected during shaping of the component 3 into the still formable core approximately coaxially to the component 3; subsequently, the material of the component 3 is embedded by injection molding partially in the material of the component 1 so that the annular component 3 surrounds the tubular socket and is enclosed between the flange 6 and the centering projection of the component 1.

Injection of the component 2 into the component 3 has the advantage that the same shaping tool can be used for shaping of both components 2 and 3. Moreover, upon injection of the component 2 into the component 3, their boundary surfaces move relative to one another and form waves and/or swirls, and this causes a positive-locking connection between the two components 2, 3.

The material of the component 2 can be surrounded completely by material of the component 3 or can extend to the connection intersurface of the component 3 and the part 4 so that the component 2 and the part 4 will connect one another only in a minimal area, if at all, as is illustrated by the lower dotted line in the drawing. As an alternative or in addition, the material of the component 2 can also extend to the flange 6 so that the component 2 and the flange 6 of the component 1 connect one another minimally, as is indicated by the upper dotted line.

The material of the component 4 in the case of a fuel container comprises at least on the outer side thereof HDPE (high-density polyethylene) through which fuels such as gasoline or diesel fuel can diffuse. In order to prevent diffusion through the plastic material, the wall of the part 4 comprises an intermediate layer(barrier) which is not permeable for fuels.

In order to enable a heat fusion connection with the material of the part 4, the component 3 also contains primarily a polyolefin, in particular, a functionalized polyethylene (PE) which, together with the HDPE of the part 4, forms a heat fusion joint by being connected to one another by friction welding or heat reflector welding. Generally, the material of the component 3 is also primarily HDPE. The functionalized PE or HDPE of the component 3 has also no sufficient locking or barrier function relative to the diffusion of fuel or, generally, hydrocarbon materials. The impermeability or locking function with regard to diffusion of fuels is achieved in that the material of the component 2 is completely or mostly embedded in the material of the component 3, as illustrated. Generally, the ratio of volumes of the components 2 and 3 is selected such that the combined properties of the two components 2, 3 with regard to fuel permeability, strength, and volume changes by swelling is approximated to that of the component 2. In this way, the total strength of both components 2, 3 is increased and the swelling capacity relative to fuel of the combination of both components 2, 3 is reduced as a result of the reduced swelling capacity of the material of the component 2 in comparison to that of the material of the component 3.

Between the components 1 and 3, moreover, a minimal free space 8 is provided into which molten material emerging at the edges of the connecting surfaces can flow when the component 3 and the part 4 are welded together.

Particularly suitable as a material for the component 1 is at least one of the materials polyamide (PA), polyoxymethylene (POM), polybutylene terephthalate (PBT), polyethylene terephthalate (PET), polyethylene naphthalate (PEN), polybutylene naphthalate (PBN), polyphenylene sulfide (PPS), polyphtalamide (PPA), i.e., partially aromatic polyamide, polypropylene (PP), aliphatic polyketone, liquid-crystal polymer (LCP), and fluoro-thermoplastic material.

The component 2 contains at least one of the materials ethylene vinyl alcohol (EVOH), PBT, PEN, PET, PBN, POM, PA, PPS, PPA, LCP, aliphatic polyketone, and fluoro-thermoplastic material. As an alternative, the component 2 can contain also at least one metal (a metal alloy) or glass.

The materials of the components 1 and 2 have thus a great barrier function relative to diffusion of hydrocarbons such as gasoline or diesel fuel.

Instead of the material of the second component to be injected into the third component, both materials can also be mixed.

In general, the shape of the component 2 inside the component 3 is selected such that 10 to 100% of the cross-section of the component 3 that is permeable for fuel is covered by the component 2.

When the combination of the materials of the components 2 and 3 is selected such that the material of the component 2 has a higher thermal shape resistance, a higher melting point, and a higher strength at higher temperatures in comparison to HDPE, not only a higher shape stability of the component 3 results but also a higher shape stability of the entire coupling member.

The processing temperature of the material of the component 2 is always selected such that it is smaller than the decomposition temperature of the material of the component 3. Moreover, the total swelling property of the materials of the combination of the components 2 and 3 is smaller than that of the material of the component 3 alone.

The materials of all components 1, 2, 3 can be reinforced, in particular, by fibers, for example, glass fibers, plastic or mineral fibers or so-called nano particles of minerals.

The thermoplastic material of at least one of the three components 1 to 3 can be cross-linked in order to improve its impermeability relative to fuel. When the materials of the components 2 and 3 are cross-linked, respectively, they form a better heat fusion connection.

The coupling member according to the invention can not only be used as a connecting socket for a fluid line, but also as a housing for a check valve, a so-called rollover valve, as it is used frequently in intake openings of a fuel tank in the vehicle in order to prevent leakage of fuels when the vehicle rolls over, or as a fuel socket of a container or as a fastening flange for a fuel pump in a fuel tank.

While specific embodiments of the invention have been shown and described in detail to illustrate the inventive principles, it will be understood that the invention may be embodied otherwise without departing from such principles.

What is claimed is:

1. A coupling member for connecting a part, provided for receiving or dispensing fuel and made primarily of HDPE (high-density polyethylene), to a fluid line, wherein the coupling member comprises:

a first component, a second component, and a third component comprised of primarily meltable material;

wherein the third component is configured to form a heat fusion joint with the part for receiving or dispensing fuel and has an undesirably high permeability and swelling capacity relative to fuel;

wherein the third component is connected to the first component by at least one of a material bonding action and a positive-locking action;

wherein the second component has a greater locking capacity relative to fuel than the third component and a higher strength than the third component;

wherein the material of the second component is embedded completely or mostly in the material of the third component;

wherein a volume ratio of volumes of the second and third components relative to one another is selected such that combined properties of the second and third components with regard to fuel permeability, strength, and volume changes by swelling are approximated to properties of the second component with regard to fuel permeability, strength, and volume changes by swelling;

wherein the materials of the first and third components are directly connected together by a heat-fusion connection.

2. The coupling member according to claim 1, wherein the primarily meltable material is thermoplastic material.

3. The coupling member according to claim 1, wherein the first component comprises at least one of the materials selected from the group consisting of PA, POM, PBT, PEN, PET, PBN, PPS, PPA, PP, LCP, aliphatic polyketone, and fluoro-thermoplastic material.

4. The coupling member according to claim 1, wherein the second component comprises at least one of the materials selected from the group consisting of EVOH, PBT, PEN, PET, PBN, POM, PA, PPS, PPA, LCP, aliphatic polyketone, and fluoro-thermoplastic material or at least a metal or glass.

5. The coupling member according to claim 1, wherein the third component comprises a polyolefin fusible with the material of the part for receiving or dispensing fuel.

6. The coupling member according to claim 5, wherein the polyolefin is a functionalized polyolefin.

7. The coupling member according to claim 1, wherein the shape of the second component within the third component is selected such that 20 to 100% of the cross-section of the third component permeable for fuel is covered by the second component.

8. The coupling member according to claim 1, wherein the second and the third components are annular.

9. The coupling member according to claim 8, wherein the first component is tubular and is surrounded by the third component.

10. The coupling member according to claim 9, wherein the first component has a flange engaging across the third component.

11. The coupling member according to claim 1, forming at least one of a connecting socket, a housing of a valve, a filling socket, and a fastening flange for a fuel pump.

* * * * *